US010098396B1

(12) United States Patent
Ochoa

(10) Patent No.: US 10,098,396 B1
(45) Date of Patent: Oct. 16, 2018

(54) METHOD OF MANUFACTURING AN ARTIFICIAL BRANCH

(71) Applicant: Ehresmann Engineering Inc, Yankton, SD (US)

(72) Inventor: Derek Ochoa, Yankton, SD (US)

(73) Assignee: Ehresmann Engineering, Inc., Yankton, SD (US)

( * ) Notice: Subject to any disclaimer, the term of this patent is extended or adjusted under 35 U.S.C. 154(b) by 0 days.

(21) Appl. No.: 15/391,371

(22) Filed: Dec. 27, 2016

(51) Int. Cl.

| | |
|---|---|
| ***H01Q 1/12*** | (2006.01) |
| ***H01Q 1/44*** | (2006.01) |
| ***A41G 1/00*** | (2006.01) |
| ***B29C 69/00*** | (2006.01) |
| ***B29C 65/00*** | (2006.01) |
| ***A47G 33/06*** | (2006.01) |
| *B29L 31/00* | (2006.01) |

(52) U.S. Cl.
CPC ............. *A41G 1/007* (2013.01); *A41G 1/001* (2013.01); *A47G 33/06* (2013.01); *B29C 66/126* (2013.01); *B29C 69/001* (2013.01); *H01Q 1/12* (2013.01); *H01Q 1/44* (2013.01); *B29L 2031/722* (2013.01); *Y10T 29/49625* (2015.01)

(58) Field of Classification Search
CPC ......... Y10T 29/49968; Y10T 29/49947; Y10T 29/49625; A41G 1/001; A41G 1/007; H01Q 1/1242; H01Q 1/44; H01Q 1/1235; H01Q 1/12; H01Q 1/1228
USPC ..... 52/651.01, 651.02, 651.07, 653.2, 655.1; 428/18; 343/890
See application file for complete search history.

(56) References Cited

U.S. PATENT DOCUMENTS

| | | | | |
|---|---|---|---|---|
| 2,826,845 | A | 3/1958 | Warren | |
| 3,100,555 | A * | 8/1963 | Ashton | B29C 66/5221 174/45 R |
| 3,115,435 | A | 12/1963 | Abramson | |
| 5,787,649 | A | 8/1998 | Popowych et al. | |
| 6,222,503 | B1 | 4/2001 | Gietema et al. | |
| 6,286,266 | B1 | 9/2001 | Popowych | |
| 6,343,440 | B1 | 2/2002 | Ayers | |
| 6,655,102 | B1 | 12/2003 | LaRue | |
| 7,616,170 | B2 | 11/2009 | Renfro et al. | |
| 8,035,574 | B2 | 10/2011 | Renfro | |
| 8,298,633 | B1 | 10/2012 | Chen | |
| 8,593,370 | B2 | 11/2013 | Caldwell et al. | |
| 2010/0072747 | A1 * | 3/2010 | Krize | A47G 33/06 285/330 |
| 2012/0236546 | A1 * | 9/2012 | Chen | F21V 21/002 362/123 |
| 2015/0184369 | A1 * | 7/2015 | Carless | E04B 1/19 52/36.4 |

* cited by examiner

*Primary Examiner* — Jermie Cozart
(74) *Attorney, Agent, or Firm* — Jeffrey A. Proehl; Woods, Fuller, Shultz & Smith, PC

(57) ABSTRACT

A method for manufacturing an artificial branch for use in providing an aesthetic element, or for providing camouflage or another structure. The joints between the various members of the artificial branch are preferably welded in place. The artificial branch preferably includes a main stem assembly including a reinforcing plug, branch stem members, limb assemblies, limb coupling members, a longitudinal support member, and foliage members.

17 Claims, 8 Drawing Sheets

METHOD OF MANUFACTURING AN ARTIFICIAL BRANCH

BACKGROUND OF THE INVENTION

Field of the Invention

The present invention relates to concealment systems used in conjunction with aesthetic design and communications antennas and more particularly pertains to a new Artificial Branch and Method of Manufacturing for providing an artificial branch with improved wind performance, improved aesthetics, and improved resistance to breakage.

Description of the Prior Art

The use of basic tree-like camouflage systems is known in the prior art. One such example of this type of structure is U.S. Pat. No. 5,787,649 issued to Popowych, which is hereby and herewith incorporated by reference into this specification.

In these respects, the Artificial Branch and Method of Manufacturing according to the present invention substantially departs from the conventional concepts and designs of the prior art, and in so doing provides an apparatus primarily developed for the purpose of providing an artificial branch structure with improved flexibility, reduced weight, improved resistance to high winds, and improved configurability, and improved manufacturability.

SUMMARY OF THE INVENTION

In view of the foregoing disadvantages inherent in the known types of concealment systems now present in the prior art, the present invention provides a new Artificial Branch and Method of Manufacturing construction wherein the same can be utilized for of providing a branch structure with improved flexibility, reduced weight, resistance to high winds, and improved configurability.

To attain this, the present invention generally comprises providing a main stem assembly, a plurality of branch stem members, a plurality of short limb assemblies, a plurality of long limb assemblies, a plurality of limb connector members, a longitudinal support member, a plurality of foliage members, a limb end assembly, and a reinforcing plug member. The specific quantities of each of the items provided is dependent, at least in part, upon the specific physical configuration of the artificial branch to be manufactured.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is increased resiliency offering better performance in high winds.

Another significant advantage of the present invention is the improved configurability to accommodate a wide range of base structure compatibility.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
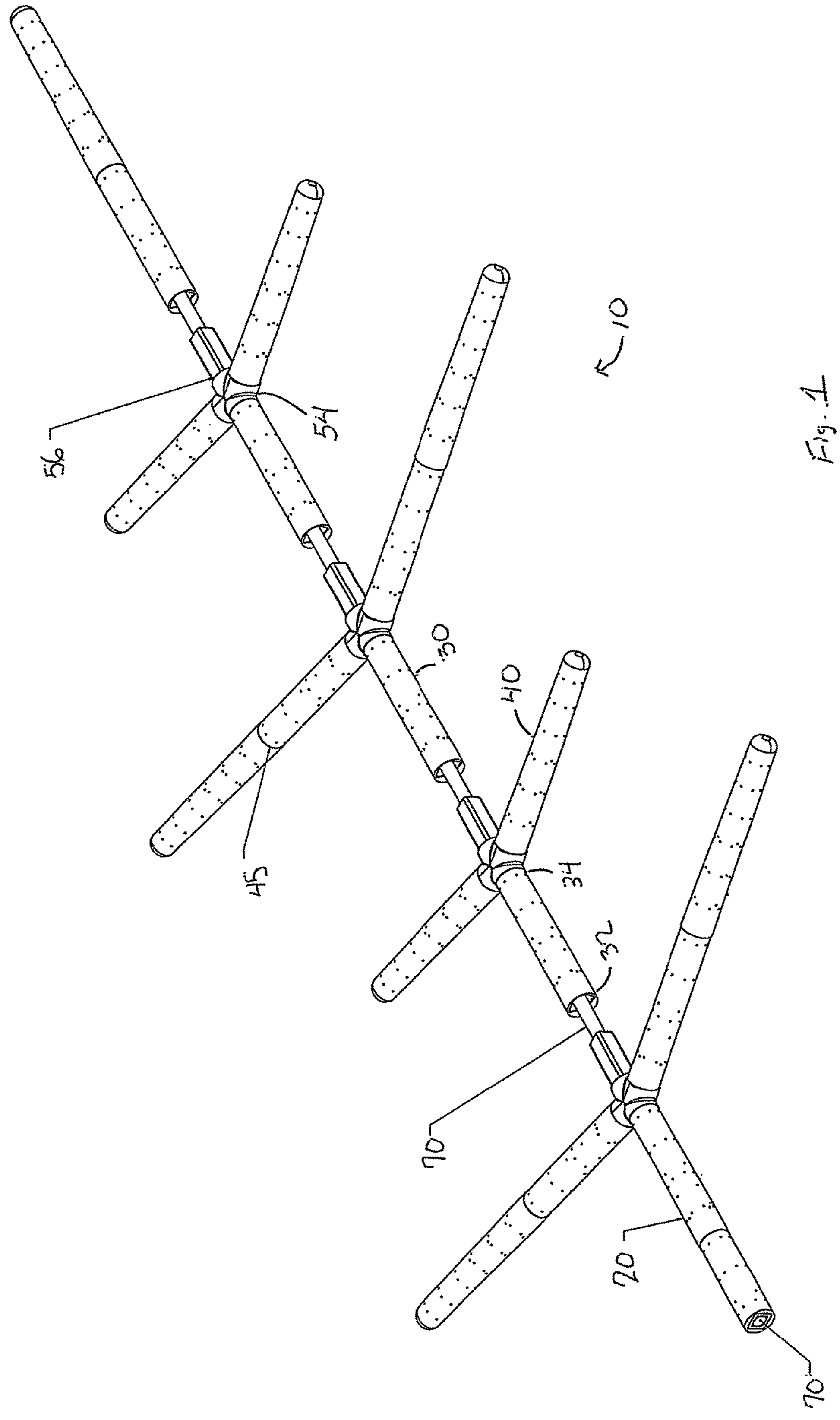
FIG. 1 is a schematic top view of a new Artificial Branch according to the present invention.
Figure 2:
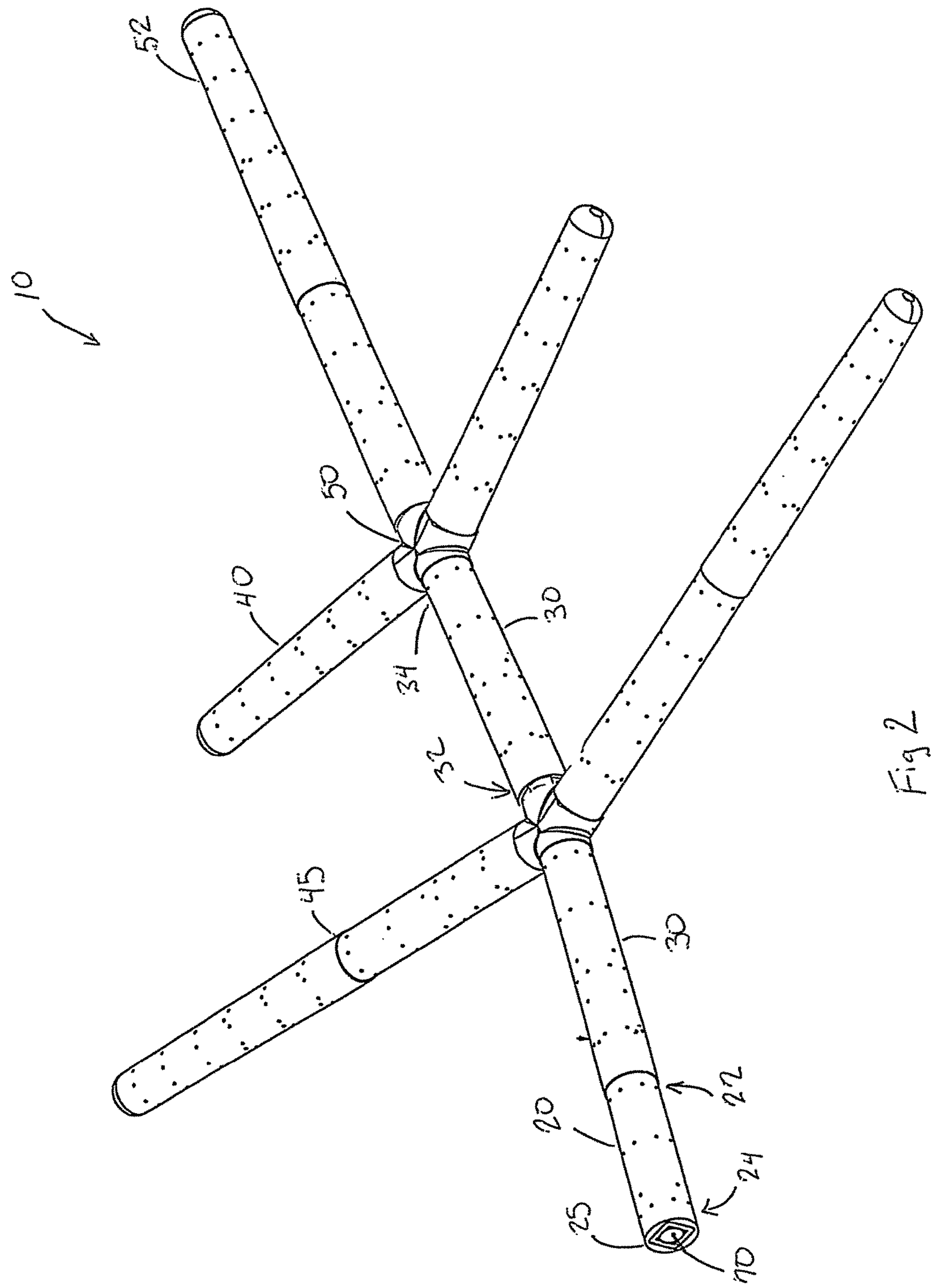
FIG. 2 is a schematic top view of the present invention.
Figure 3:
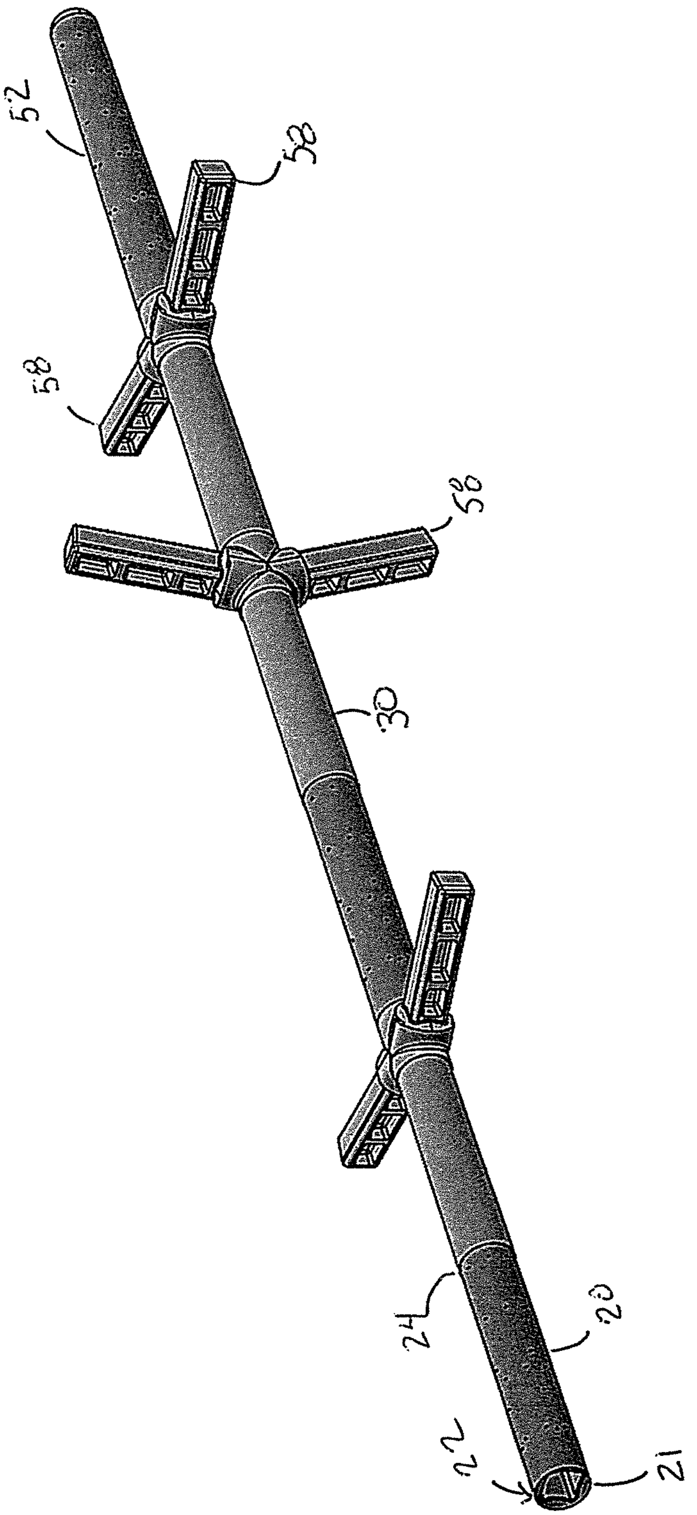
FIG. 3 is a schematic perspective view of the main stem assembly and branch stem members of the present invention.
Figure 4:
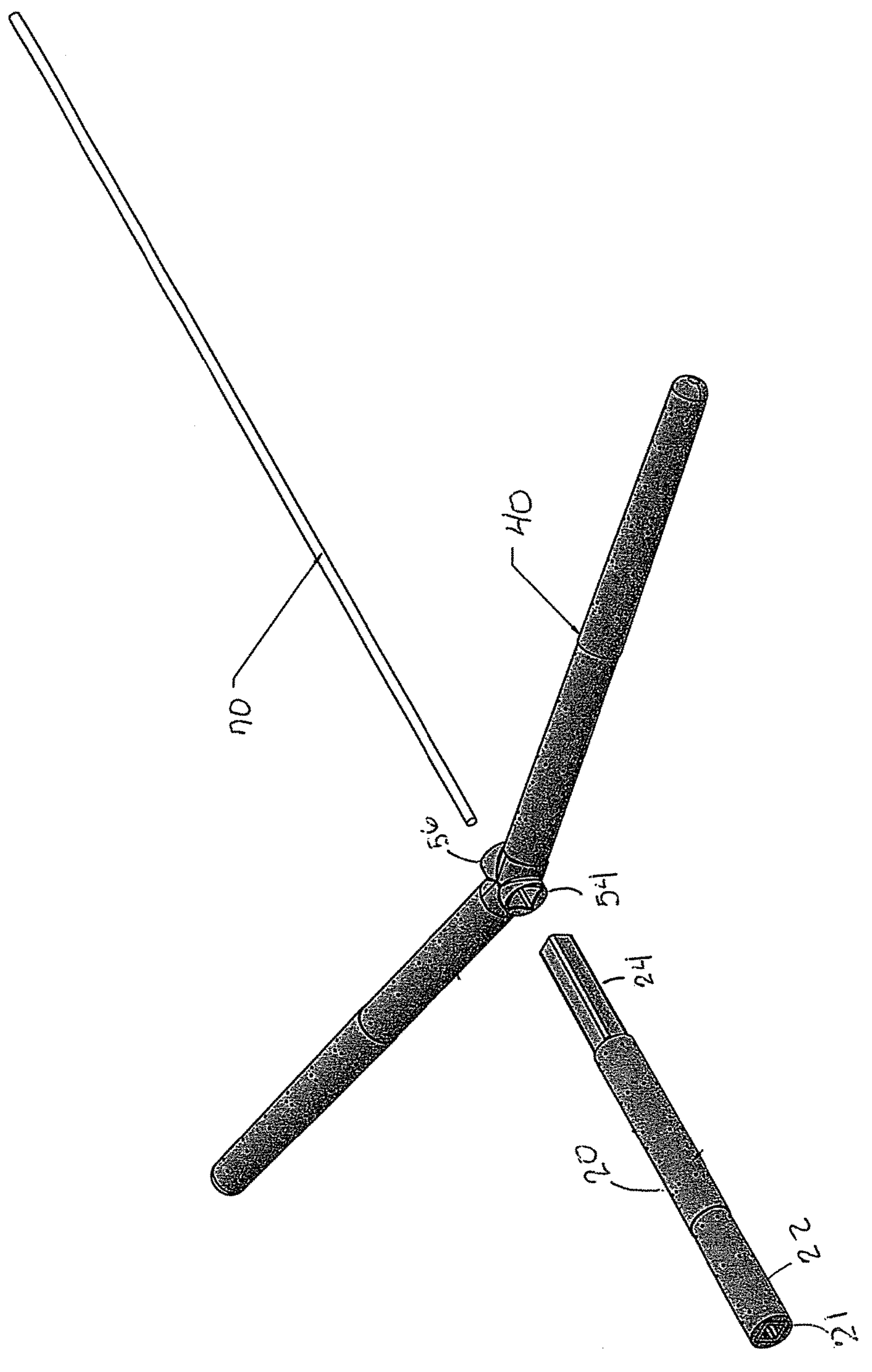
FIG. 4 is a schematic side view of the longitudinal support member, the main stem member, and limb connector member of the present invention.
Figure 5:
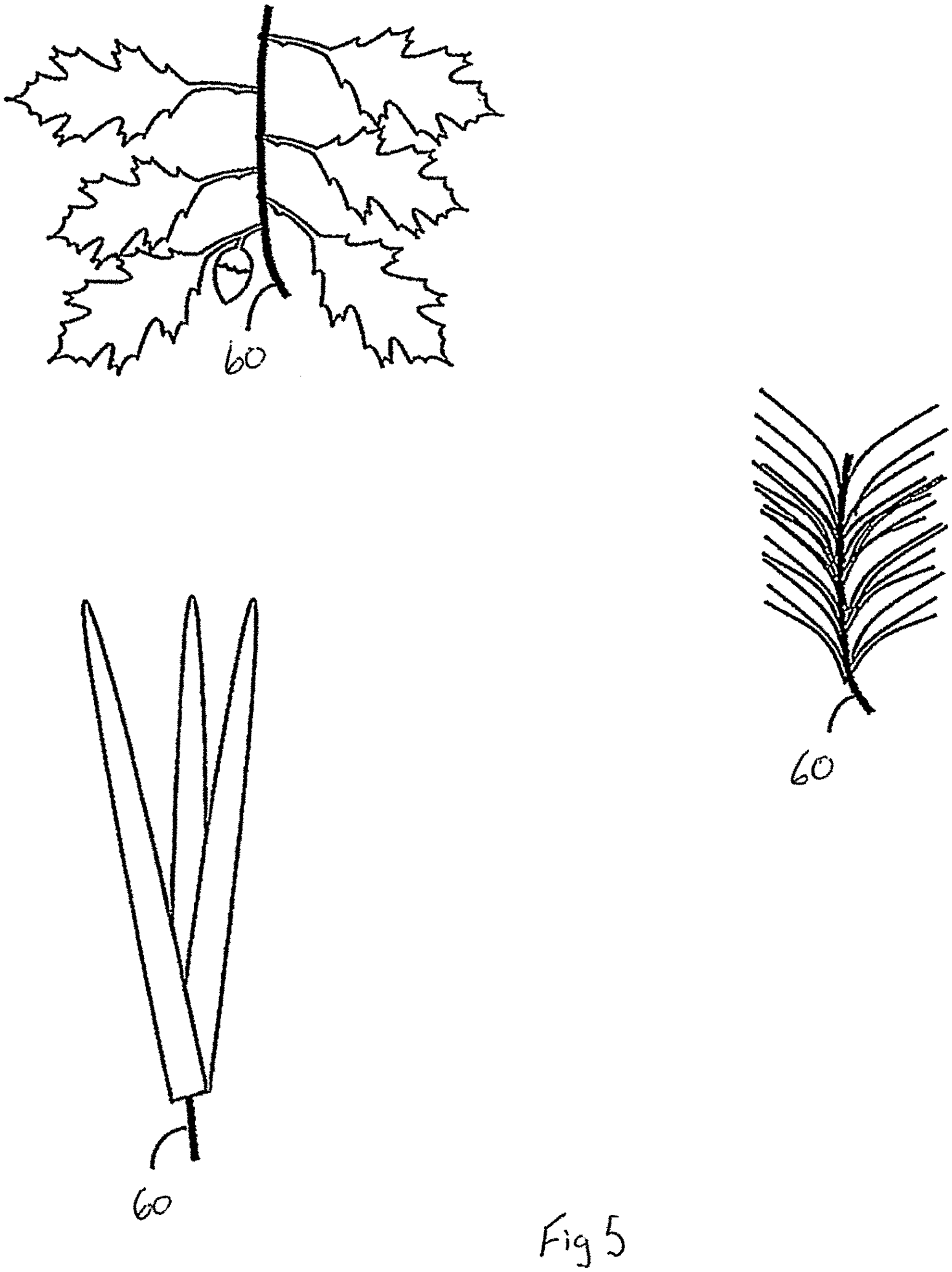
FIG. 5 is a schematic side view of a foliage plug of the present invention.
Figure 6:
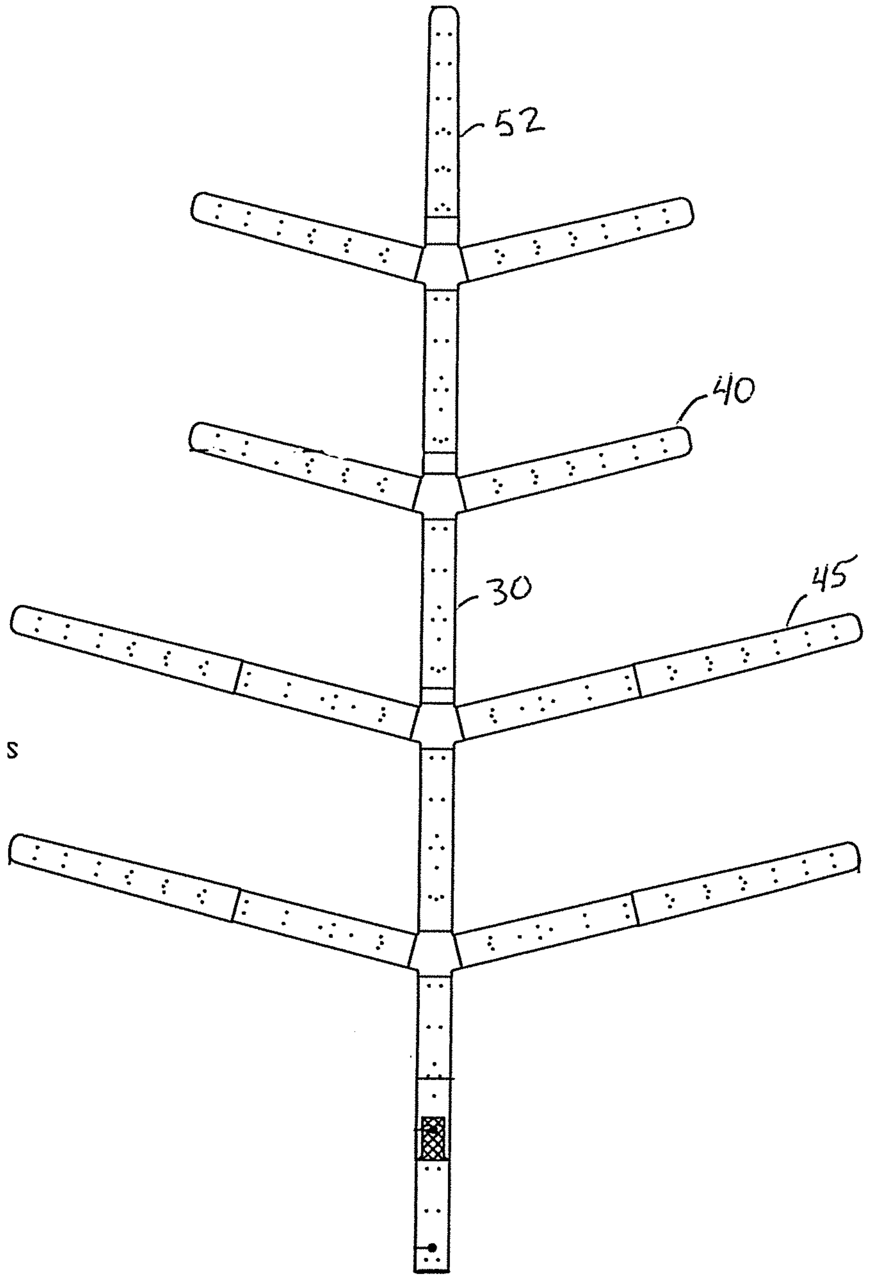
FIG. 6 is a schematic side view of a second embodiment of the present invention.
Figure 7:
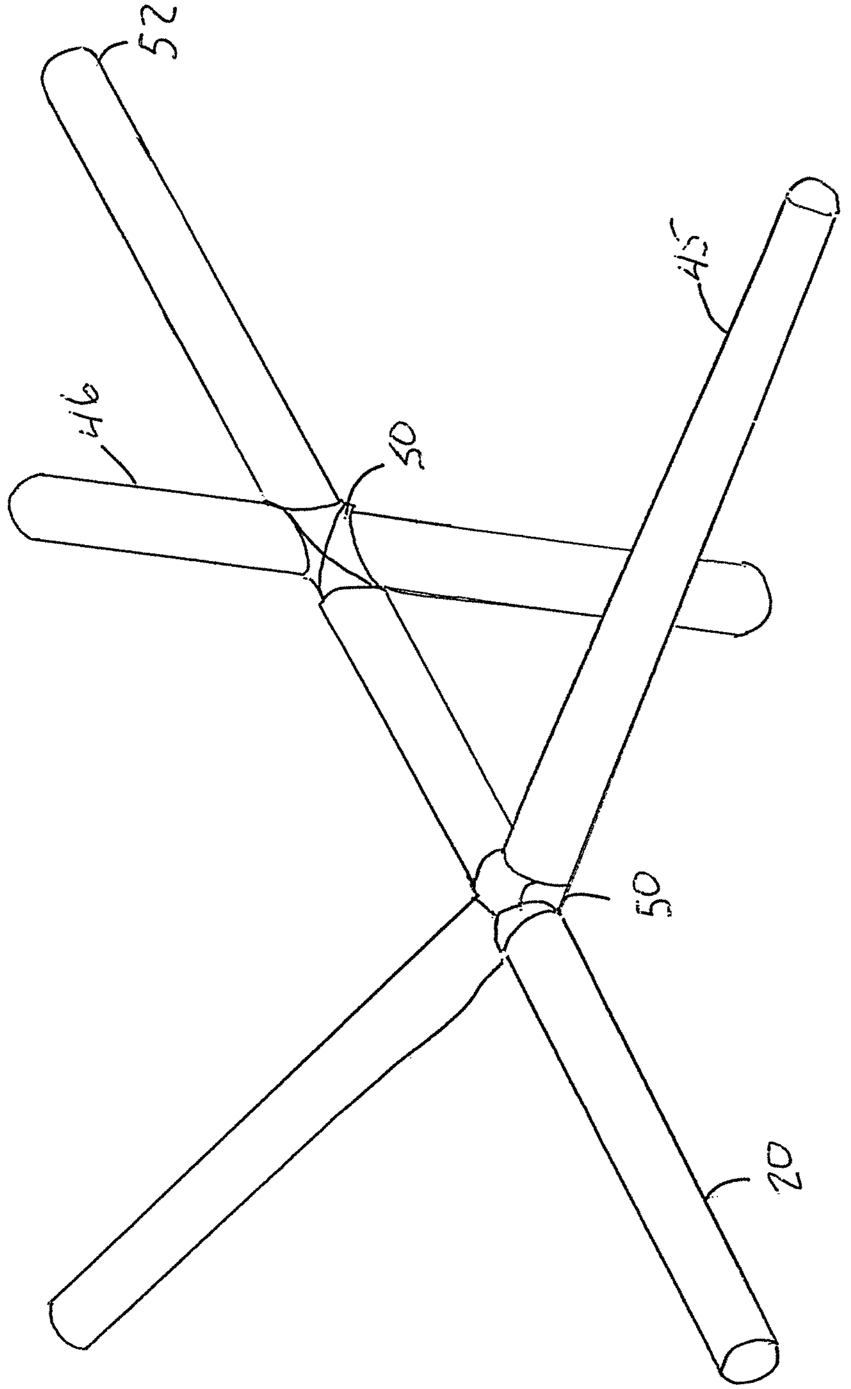
FIG. 7 is a schematic side view of a third embodiment of the present invention.
Figure 8A:
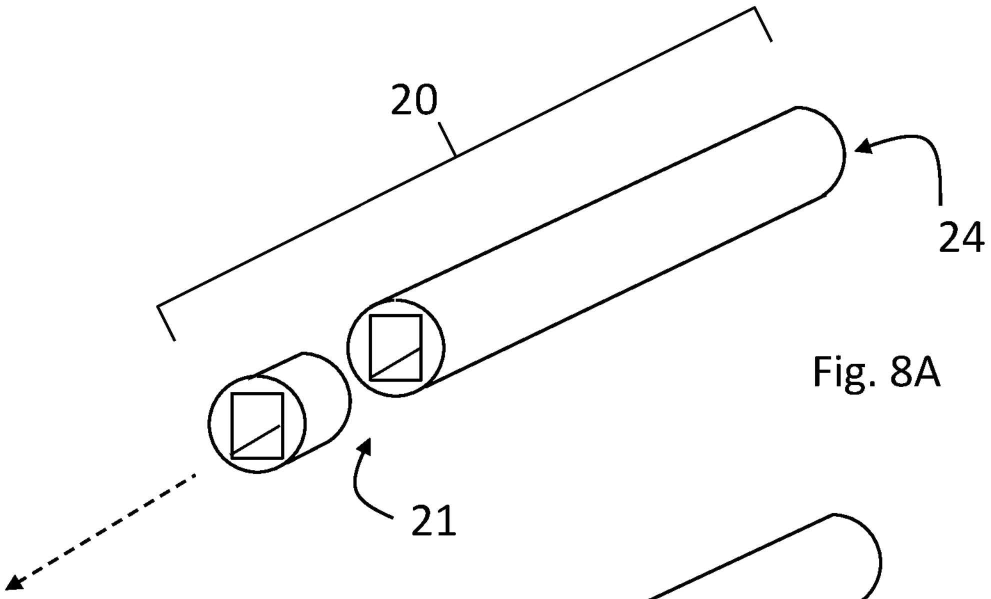
FIG. 8A is schematic isometric view of the Main Stem Member having a length cut off adjacent to the first end.
Figure 8B:
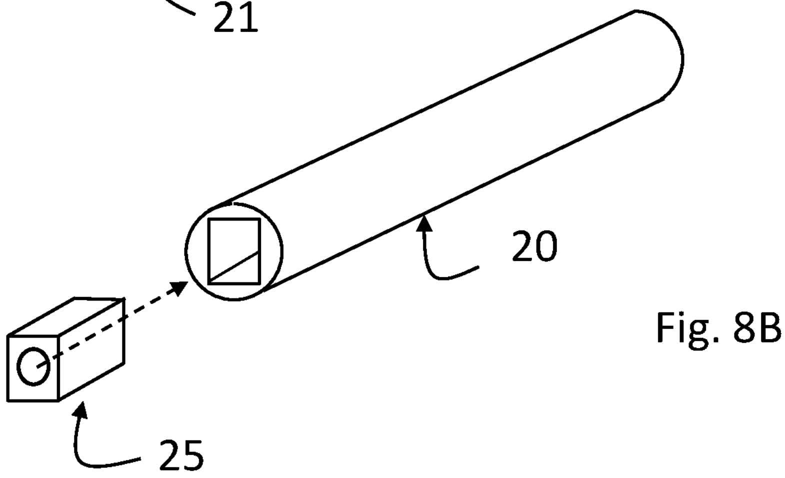
FIG. 8B is a schematic isometric View of the Main Stem Member and the Reinforcing Plug Member.
Figure 8C:
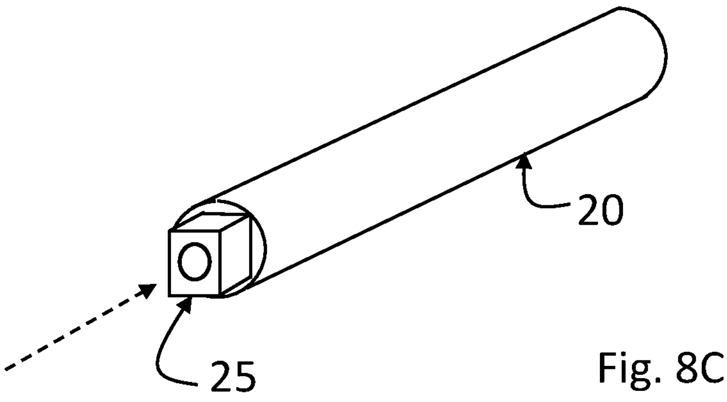
FIG. 8C is a schematic isometric view of the Main Stem Member with the Reinforcing Plug member partially inserted into the first end.

With reference now to the drawings, and in particular to FIGS. 1 through 8 thereof, a new Artificial Branch and Method of Manufacturing embodying the principles and concepts of the present invention and generally designated by the reference numeral 10 will be described.

The method of manufacturing an artificial branch 10 includes providing a main stem assembly 20, a plurality of branch stem members 30, a plurality of short limb assemblies 40, a plurality of long limb assemblies 45, a plurality of limb connector members 50, a longitudinal support member 70, a plurality of foliage members 60, a limb end assembly 52, and a reinforcing plug member 25. The specific quantities of each of the items provided is dependent, at least in part, upon the specific physical configuration of the artificial branch 10 to be manufactured.

The main stem assembly 20, branch stem members 30, short 40 and long limb assemblies 45, and limb end assembly 52 may be made from acrylonitrile butadiene styrene, polyvinyl chloride, polybenzimidazole, polyethylene, fiberglass wrapped acrylonitrile butadiene styrene, fiberglass wrapped polyvinyl chloride, fiberglass wrapped polybenzimidazole, fiberglass wrapped polyethylene, low density polyethylene, high density polyethylene, or a combination thereof. Preferably, high density polyethylene is used.

As an initial step, the reinforcing plug member 25 is typically inserted to a bore 21 of the main stem member 20 adjacent to a first end 22 of the main stem member 20. It should be noted, that the main stem member 20 may be manufactured and provided with a reinforcing plug 25 integrally formed into the main stem member 20. Additionally, depending upon the configuration desired, the main stem member 20 may be cut to a desired length. Optionally, the reinforcing plug member 25 may be welded into the first end 22 of the main stem member 20.

The reinforcing plug member 25, when installed into the main stem member 20 provides additional structural support for mounting the assembled artificial branch 10 to a vertical structure.

A longitudinal support member 70 may be inserted into the main stem member 20 adjacent to a second end 24 of the main stem member 20. The present invention contemplated both configurations in which the second end 24 of the main stem member 20 is cored to accept the longitudinal support member 70, as well as those in which the second end 24 of the main stem member 20 is formed with an aperture providing an interference fit with the longitudinal support member 70.

A first branch stem member 30 is positioned over the longitudinal support member 70 and may operationally couple a first end 32 of the first branch stem member 30 to the second end 34 of the main stem assembly 20.

A first limb connector member 50 is positioned over the longitudinal support member 70 and operationally couples a first end 54 of the first limb connector member 50 to a second end 34 of the first branch stem member 30. The first limb connector member 50 has at least one side coupling portion 58. The limb connector members 50 may have a profile which is substantially cruciform, positions one or multiple side coupling portions 58 at an angular relationship compared to a plane defined by the first end 54 and the second end 56. The angle of each side coupling portion 58 does not have to be uniform, symmetrical, or parallel.

Depending upon the specific physical configuration desired either at least one short limb assembly 40 or at least one long limb assembly 50 is selected and then operationally coupled to the at least one side coupling portion 58.

A second branch stem member 30 is positioned over the longitudinal support member 70 and operationally couples a first end of the second branch stem member to a second end of the first limb connector member 50.

A second limb connector member 50 is positioned over the longitudinal support member 70 and operationally couples a first end of the second limb connector member 50 to a second end of the second branch stem member 30.

Again, depending upon the specific physical configuration desired, a second at least one short limb assembly 40 or at least one long limb assembly 50 is selected and then operationally coupled to a side coupling portion 58 of the second limb connector member 50.

The steps of positioning a branch stem member, positioning a limb connector member, selecting at least one short limb assembly or at least one long limb assembly, and operationally coupling the branch stem member, limb connector member, and selected limb assembly are repeated as necessary until the desired branch configuration is achieved The limb end assembly 52 is positioned onto a second end of the longitudinal support member 70.

The plurality of foliage members 60 is then operationally coupled onto the plurality of short limb assemblies 40 and long limb assemblies 45.

While the foliage members 60 are typically colored and formed to resemble pine needles, the foliage members may include foliage, ghillie strips, lights, tarps, banners and other similar items used to provide camouflage or a desired aesthetic. Not every foliage member 60 on a given system 10 needs to be the same type or identical within the type of materials.

In at least one embodiment, each one of the branch stem members has a bore extending therethrough. The bore has a bore first end and a bore second end. Each one the branch stem members having a first end and a second end. The second end preferably has a cross-section diameter smaller than a cross-section diameter of the first end, and the bore first end has a bore cross-section slightly larger than the branch stem member second end cross-section such that the branch stem member second end may be inserted into a bore first end of a second branch stem member.

In a further embodiment, each one of the first limb connector member has a connector bore extending therethrough. The connector bore has a cross-section diameter approximately equivalent to the bore cross-section such that a branch stem member second end may be inserted through the connector bore.

In still a further embodiment, each one of the side coupling portions of the limb connector members have a cross-section diameter approximately equivalent to the branch stem member second end cross-section diameter.

In a preferred embodiment, the branch stem second end, the bore first end cross-section, connector bore, and the side coupling portions have a geometric cross-section which inhibits rotation. Illustrative examples of cross-section shapes which inhibit rotation include, but are not limited to square, triangle, cross, pentagon, hexagon, octagon, and similar shapes.

In a preferred embodiment, the method also includes the steps of welding each joint formed by an operational coupling between a main stem member and branch stem member, branch stem member and branch stem member, branch stem member and limb connector member, limb connector member to limb connector member, limb connector member to short limb assembly, limb connector member to long limb assembly, or branch stem member to limb end assembly.

In a further embodiment, the steps of providing a plurality of short limb assemblies and providing a plurality of long limb assemblies further includes the steps of: (a) providing a plurality of main limb members; (b) providing a plurality of limb tip members; (c) determining a length of limb assembly to be provided; (d) operationally coupling a limb tip member to a first main limb member; (e) operationally coupling a second main limb member to said first main limb member if desired; (f) operationally coupling a subsequent main limb member to the second main limb member if desired; (g) drilling a plurality of foliage attachment bores into selected main limb members and the limb tip member if desired; and (h) welding each joint formed by an operational coupling between main limb members or between a main limb member and the limb tip member.

In at least one embodiment foliage attachment bores are drilled into the short limb assemblies and long limb assemblies for facilitating the attachment of foliage members.

In a preferred embodiment, each of the joints formed between branch stem members, limb assemblies, limb connector members, limb end assemblies, and the main stem assembly are welded.

In at least one embodiment, the system 10 is able to withstand winds of up to one hundred miles per hour for at least ten minutes without breakage of the main stem assembly 20, limb connector members 50, Long and Short Limb Assemblies 45,40, and Branch Stem Assemblies 30.

In a more preferred embodiment, the system 10 is able to withstand winds of up to 150 miles per hour for at least ten minutes without breakage of the main stem assembly 20, limb connector members 50, Long and Short Limb Assemblies 45,40, and Branch Stem Assemblies 30.

In another preferred embodiment, each of the main stem assembly 20, branch stem members 30, short limb assemblies 40, long limb assemblies 45, limb connector members 50, and foliage members 60 are effectively transparent to RF radiation so as to not provide significant loss for an RF signal transmitted from or received by an antenna coupled to the base structure 2.

Again, those skilled in the art may readily appreciate that the present invention encompasses embodiments where the various members are textured, colored, or both to provide additionally concealment or camouflage. An illustrative example, and not for purposes of limitation may be to have the various members colored and textured to resemble a specific type of tree or bush.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

INDEX OF ELEMENTS FOR ARTIFICIAL BRANCH AND METHOD OF MANUFACTURING

2. base structure
10. Artificial Branch
11.
12.
13.
14.
15.
16.
17.
18.
19.
20. Main Stem Assembly
21. Bore
22. First End
23.
24. Second End
25. Reinforcing Plug Member
26.
27.
28.
29.
30. Branch Stem Members
31.
32. First End
33.
34. Second End
35.
36.
37.
38.
39.
40. Short Limb Assembly
41.
42.
43.
44.
45. Long Limb Assembly
46.
47.
48.
49.
50. Limb Connector Member
51.
52. Limb End Assembly
53.
54. First End
55.
56. Second End
57.
58. Side Coupling Portion
59.
60. Foliage Member
61.
62.
63.
64.
65.
66.
67.
68.
69.
70. Longitudinal Support Member
71.
72.
73.
74.
75. Side couple Portion
76.
77.
78.
79.

I claim:

1. A method of manufacturing an artificial branch comprising the steps of:

providing a main stem member, said main stem member having a first end and a second end, said main stem member having a bore extending therethrough from said first end to said second end;

providing a reinforcing plug member;

inserting said reinforcing plug member into said bore of said main stem member adjacent to said first end of said main stem member;

providing a longitudinal support member;

inserting said longitudinal support member into said main stem member adjacent to said second end of said main stem member;

providing at least one limb member, said at least one limb member having a bore extending therein from a first end of said limb member;

positioning said at least one limb member over said longitudinal support member such that said first end of said limb member slideably engages said second end of said main stem member; and welding said at least one limb member to said main stem member.

2. The method of claim 1, further comprising the steps of:

providing at least one limb connector member, said limb connector member being selectively positionable on a second end of a limb member, said limb connector member having at least one side coupling portion;

providing at least one branch stem member, said branch stem member being operationally coupleable to said limb connector member;

positioning said limb connector member over said longitudinal support member and operationally coupling said limb connector member to a second end of said limb member; and operationally coupling said branch stem member to said limb connector member.

3. The method of claim 1, further comprising the steps of:

providing at least one limb connector member, said limb connector member having a longitudinal bore extending therethrough, said limb connector member being operationally coupleable to a second end of said limb member, said limb connector member having a pair of branch coupling members extending outwardly;

providing at least one pair of branch assemblies, each one of said pair of branch assemblies being operationally coupleable to an associated one of said pair of branch coupling members;

positioning said limb connector member over said longitudinal support member such that a portion of said longitudinal support member extends through said longitudinal bore of said limb connector member;

operationally coupling said limb connector member to said limb member;

operationally coupling each one of said pair of branch assemblies to an associated one of said branch coupling members.

4. The method of claim 3, wherein the step of providing at least one pair of branch assemblies further comprises the step of providing at least two branch tip assemblies, each one of said branch tip assemblies having a first end and a second substantially closed end.

5. The method of claim 4, wherein the step of providing at least one pair of branch assemblies further comprises the step of providing at least two main branch members, each one of said main branch members being operationally coupleable between an associated one of said pair of branch tip assemblies and an associated one of said pair of branch coupling members.

6. The method of claim 5, wherein each one of said pair of branch tip assemblies is welded to an associated one of said pair of main branch members and each one of said pair of main branch members is welded to an associated one of said pair of branch coupling members.

7. The method of claim 5, wherein said step of providing at least two main branch members further comprises the step of drilling a plurality of foliage attachment bores into each one of said at least two main branch members.

8. The method of claim 4, wherein said step of providing at least two branch tip assemblies further comprises the step of drilling a plurality of foliage attachment bores into each one of said branch tip assemblies.

9. The method of claim 4, further comprising the steps of:

providing a limb end assembly, said limb end assembly having a bore extending therein adjacent to a first end, said limb end assembly having a second end being substantially closed;

positioning said limb end assembly over said longitudinal support member;

operationally coupling said limb end assembly to a second end of a branch stem member or limb connector member.

10. The method of claim 1, further comprising the step of cutting off a length of said main stem member adjacent to said first end of said main stem member prior to inserting said reinforcing plug member.

11. The method of claim 1, further comprising the step of welding said plug member into said main stem member.

12. The method of claim 1, further comprising the step of coring at least a portion of a length of said bore of said main stem member from said second end to facilitate accepting said longitudinal support member.

13. A method of manufacturing an artificial branch comprising the steps of:

providing a main stem member with at least one bore;

providing a plurality of branch stem members;

providing a plurality of short limb assemblies;

providing a plurality of long limb assemblies;

providing a plurality of limb connector members;

providing a longitudinal support member;

providing a plurality of foliage members;

providing a limb end assembly providing a reinforcing plug member;

inserting said reinforcing plug member into said bore of said main stem member adjacent to a first end of said main stem member;

inserting said longitudinal support member into said main stem member adjacent to a second end of said main stem member;

positioning a first branch stem member over said longitudinal support member and operationally coupling a first end of said first branch stem member to said second end of said main stem member;

positioning a first limb connector member over said longitudinal support member and operationally coupling a first end of said first limb connector member to a second end of said first branch stem member, said first limb connector member having at least one side coupling portion;

selecting at least one short limb assembly or at least one long limb assembly, operationally coupling the selected short limb assembly or long limb assembly to said at least one side coupling portion;

positioning a second branch stem member over said longitudinal support member and operationally coupling a first end of said second branch stem member to a second end of said first limb connector member;

positioning a second limb connector member over said longitudinal support member and operationally coupling a first end of said second limb connector member to a second end of said second branch stem member, said second limb connector member having at least one side coupling portion;

selecting a second at least one short limb assembly or at least one long limb assembly, operationally coupling the second selected short limb assembly or long limb assembly to said at least one side coupling portion of said second limb connector member;

repeating the steps of positioning a branch stem member, positioning a limb connector member, selecting at least one short limb assembly or at least one long limb assembly, and operationally coupling the branch stem member, limb connector member, and selected limb assembly until a desired branch configuration is achieved;

positioning said limb end assembly onto a second end of said longitudinal support member;

operationally coupling said plurality of foliage members onto the plurality of short limb assemblies and long limb assemblies.

14. The method of claim 13, further comprising:

wherein each one of said branch stem members have a bore extending therethrough, said bore having a bore first end and a bore second end, each one said branch stem members having a first end and a second end, said second end having cross-section diameter smaller than a cross-section diameter of said first end, said bore first end having a bore cross-section slightly larger than said branch stem member second end cross-section such that said branch stem member second end may be inserted into a bore first end of a second branch stem member;

wherein each one of said first limb connector member has a connector bore extending therethrough, said connector bore having a crosssection diameter approximately equivalent to said bore crosssection such that a branch stem member second end may be inserted through said connector bore;

wherein each one of said side coupling portions of said limb connector members have a cross-section diameter approximately equivalent to said branch stem member second end cross-section diameter.

15. The method of claim 14, wherein said branch stem second end, said bore first end cross-section, connector bore, and said side coupling portions have a geometric cross-section which inhibits rotation.

16. The method of claim 15, further comprising the steps of welding each joint formed by an operational coupling between a main stem member and branch stem member, branch stem member and branch stem member, branch stem member and limb connector member, limb connector member to limb connector member, limb connector member to short limb assembly, limb connector member to long limb assembly, or branch stem member to limb end assembly.

17. The method of claim 16, wherein the steps of providing a plurality of short limb assemblies and providing a plurality of long limb assemblies further comprises the steps of:

providing a plurality of main limb members;

providing a plurality of limb tip members;

determining a length of limb assembly to be provided;

operationally coupling a limb tip member to a first main limb member;

operationally coupling a second main limb member to said first main limb member if desired;

operationally coupling a subsequent main limb member to the second main limb member if desired;

drilling a plurality of foliage attachment bores into selected main limb members and a limb tip member if desired;

welding each joint formed by an operational coupling between main limb members or between a main limb member and said limb tip member.

* * * * *